H. L. VAUGHAN.
KEY RING.
APPLICATION FILED OCT. 22, 1914.
1,162,955.
Patented Dec. 7, 1915.
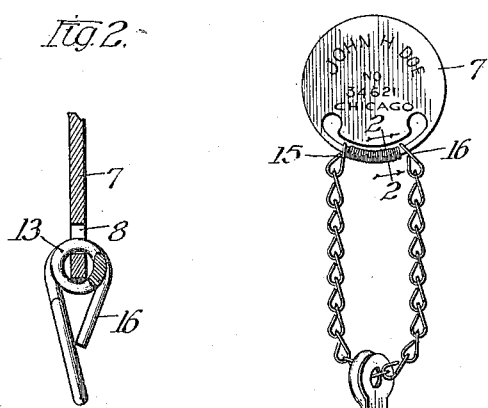
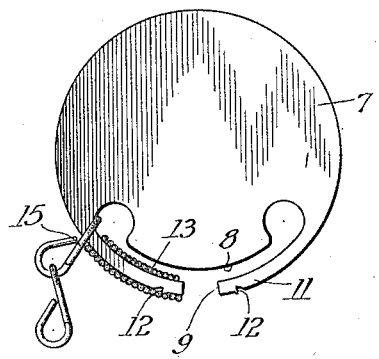
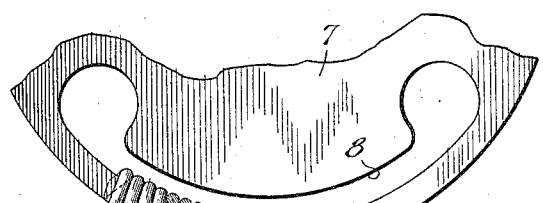
Witnesses:
Robert H. Weir
Arthur W. Carlson
Inventor
Harry L. Vaughan
James R. Offield. Atty.

UNITED STATES PATENT OFFICE.

HARRY L. VAUGHAN, OF CHICAGO, ILLINOIS, ASSIGNOR TO CROWN THROAT & OPENER COMPANY, OF CHICAGO, ILLINOIS, A CORPORATION OF ILLINOIS.

KEY-RING.

1,162,955.   Specification of Letters Patent.   Patented Dec. 7, 1915.

Application filed October 22, 1914. Serial No. 867,968.

*To all whom it may concern:*

Be it known that I, HARRY L. VAUGHAN, a citizen of the United States, residing at Chicago, in the county of Cook and State of Illinois, have invented certain new and useful Improvements in Key-Rings, of which the following is a specification.

My invention relates to certain new and useful improvements in key rings of the type wherein a single length of chain is secured to a retaining member and the ends of which are detachably connected to said retaining member whereby the keys may be placed upon or removed from the chain.

The particular novelty of my invention resides in a key ring whereby the ends may be alternately released but both ends cannot be released at the same time.

Further advantages of the invention reside in the simplicity of construction and ease of operation.

In the accompanying drawing Figure 1 is a plan view of my improved key chain. Fig. 2 is an enlarged section on the line 2—2 of Fig. 1; Fig. 3 is an edge view of the retaining member shown in Fig. 4; Fig. 4 is an enlarged plan view of the retaining member shown in Fig. 1 with the spring in section. Fig. 5 is a view similar to Fig. 4 with the spring in position for releasing one side of the chain. Fig. 6 is an enlarged plan view of the retaining member with parts broken away and other parts in section.

Referring now more particularly to the drawing, my invention consists of a retaining member 7, herein shown in the form of a disk and provided with a slot 8 near one edge thereof. The slot 8 is provided with an opening 9, at a point substantially intermediate the ends of the slot, thereby forming two fingers 10 and 11.

Near the end of each finger notches 12 are formed which project beyond the periphery of the retaining member and form threads for the locking member or spring 13. The locking member 13 is sufficiently large in diameter to surround the fingers 10 and 11, and of such a length as to span the slot 9 and overlie the ends of the fingers for a little distance. Any form of key chain 14 may be employed that is provided with links at one or both ends to pass over either of the fingers 10 or 11.

From the foregoing description it will be seen that the parts described are assembled and operate in the following manner: The locking member or spring 13 is brought into registering alinement with one of the fingers, such as the finger 10, and by turning the helical spring the notch 12 will enter between the adjacent helices, thereby serving as threads so that as the spring is turned in one direction it will move along the finger 10, as shown in Fig. 5. The key chain is, of course, first connected to the finger 10 by running the end link 15 of the chain over the finger and the end link 15 is moved along the end of the finger by the spring 13 and held within the slot because the spring is of greater diameter than the diameter of the opening in the link. The link at the other end of the chain is then slipped over the finger 11, whereupon the spring or locking member 13 is turned and its free end moved toward the end of the finger 11. The free end of the locking member is then brought into registering alinement with the end of the finger 11, thus arcing the spring, and by further turning the spring the opening 9 is closed and the two end links of the chain are held in the position shown in Fig. 4.

There are two particular points of the invention that should be specially noticed. First, that the spring 13 is sufficiently large in diameter to prevent the link 15 from sliding off the finger 10 when the link 16 is removed from the finger; thus there is no liability of both ends of the chain being released at the same time and allowing all of the keys upon the chain to drop therefrom. Second, the spring 13 is curved, when in position to lock both ends of the chain, and thus a better frictional engagement between the curved fingers and the spring is obtained, thereby preventing accidental displacement of the spring.

While the notches formed upon the fingers constitute a simple and economical way of forming the threads to engage between the convolutions of the spring, nevertheless, I do not wish it understood that I am limited to this particular means of so forming the threads, and Therefore without confining myself to the precise details of the construction herein shown, I claim:

1. A key ring comprising a plate having a curved edge and slotted near said curved edge to thereby form two curved fingers having their adjacent ends separated, a key chain having a link at one end adapted to slide over one of said fingers and a helical spring locking member movably connected to said curved fingers.

2. A key ring comprising a plate having a curved edge and slotted near said curved edge to thereby form two curved fingers having their adjacent ends separated, a key chain having a link at one end adapted to slide over one of said fingers and a helical spring locking member having a threaded engagement with the ends of said fingers.

HARRY L. VAUGHAN.

Witnesses:
SADIE M. RYAN,
JAMES R. OFFIELD.

Copies of this patent may be obtained for five cents each, by addressing the "Commissioner of Patents, Washington, D. C."